May 10, 1932.  J. E. WALKER  1,857,748
GLASS CUTTING MACHINE
Filed June 22, 1922
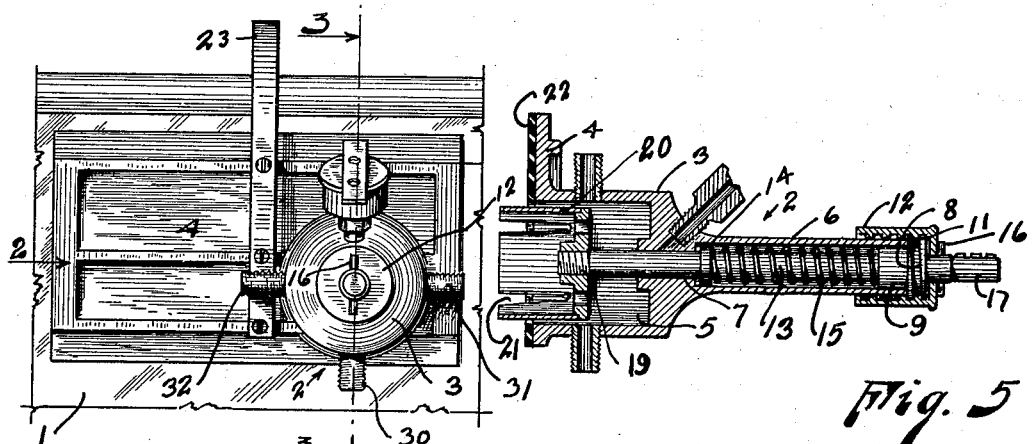
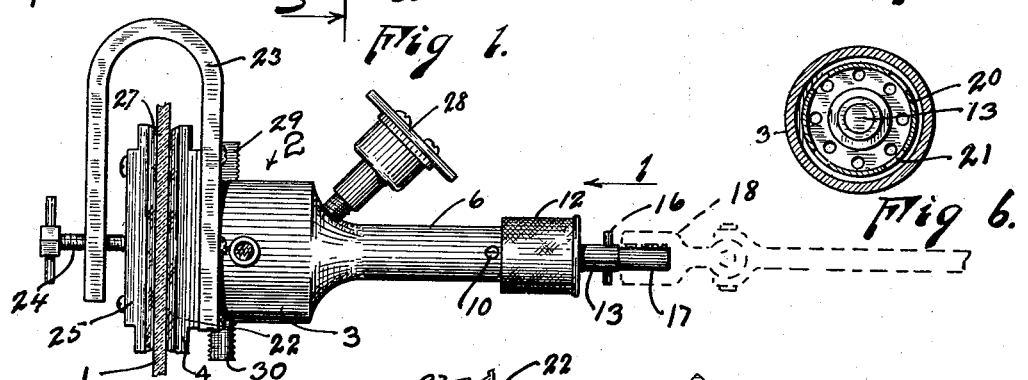
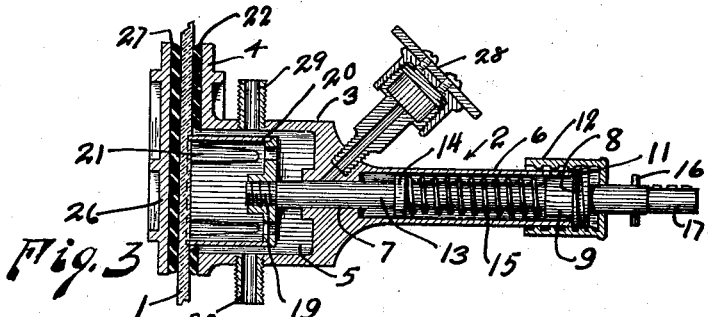
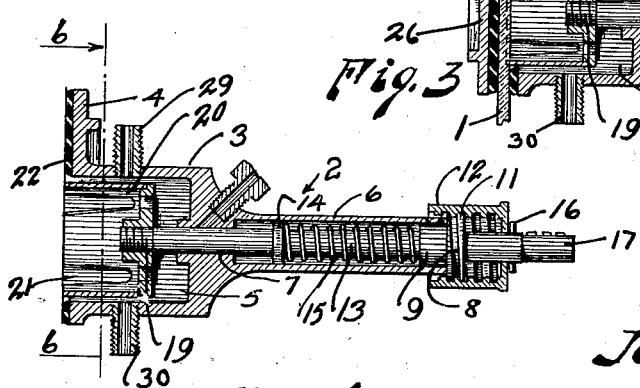
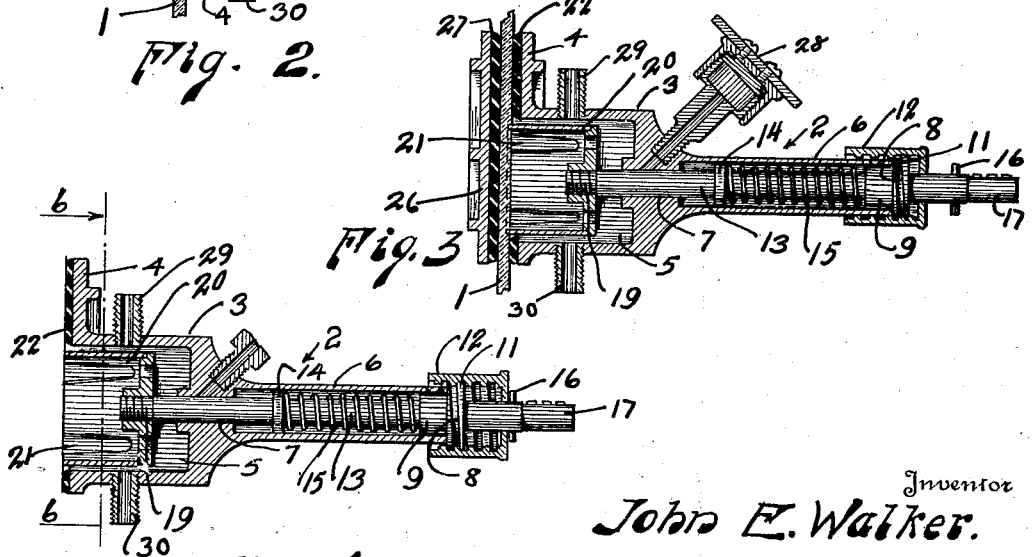
Inventor
John E. Walker.

Patented May 10, 1932 1,857,748

UNITED STATES PATENT OFFICE

JOHN EUGENE WALKER, OF ATLANTA, GEORGIA, ASSIGNOR, BY MESNE ASSIGNMENTS, TO THE CLYMER MANUFACTURING COMPANY, OF DENVER, COLORADO, A CORPORATION OF COLORADO

GLASS CUTTING MACHINE

Application filed June 22, 1922. Serial No. 570,066.

This invention relates to improvements in devices for cutting round holes in plate glass, and has special reference to a device adapted for use in cutting circular openings in automobile windshields.

It has lately become customary to mount the spotlights of an automobile on the glass of the windshield, and for this purpose it has been necessary to remove the windshield and to take it into the shop where the hole has been cut by means of an ordinary cutter operated by a drill press. This method of cutting the holes, although very satisfactory results are obtained thereby, nevertheless is objectionable on account of the great amount of labor that is involved in removing the windshield and replacing the same.

It is the object of this invention to produce a device by means of which the desired hole may be cut through the glass of the windshield, without removing the same from the automobile.

In order to more clearly describe my invention, I shall have reference to the accompanying drawings, in which Fig. 1 is an elevation of the device mounted in position for use, viewed in the direction of arrow 1, Fig. 2;

Fig. 2 is a side elevation looking in the direction of arrow 2, Fig. 1, the glass of the windshield being shown in section;

Fig. 3 is a section taken on the line 3—3, Fig. 1, viewed in the direction of the arrows;

Fig. 4 is a detail view similar to Fig. 3, but showing the cutter held in the retracted position;

Fig. 5 is a view like Fig. 4, but showing the cutter released and at its forward limit of movement;

Fig. 6 is a cross section taken on the line 6—6, Fig. 4, viewed in the direction of the arrows.

The same reference numerals will be used to designate the same parts throughout the several views.

Numeral 1 represents the glass through which it is desired to cut a round hole, and 2 represents my improved cutting machine as a whole. My cutting machine consists of a tubular body member having an enlarged head 3 which is formed integral with a plate 4. The head 3 has a cylindrical cavity 5 therein, the purpose of which will hereinafter appear. The main portion of the body member has a cylindrical opening 6, between which and the cavity 5 there is a bearing portion 7 which may be integral as shown, or formed of a separate piece of bronze. To the outer end of the main portion of the body member I secure a second bearing 8 which has a portion 9 of reduced diameter and adapted to fit snugly within the end of the cylindrical opening 6 and is held in place by a screw 10. The outer end of bearing 8 is provided with square threads 11 of about one-quarter inch pitch. A cap 12 is rotatably mounted on the bearing 8 and is internally threaded to engage with threads 11.

Mounted in the bearings 7 and 8 is a shaft 13 which is provided intermediate its ends with a collar 14. A spring 15, of the helical compression type, surrounds shaft 13 and abuts its ends against collar 14 and bearing 9 and thereby tends to move the shaft and collar in the direction of the bearing 7. Shaft 13 extends out beyond the cap 12 and is provided with a pin 16 which engages the end of cap 12. When it is desired to move the shaft 13 against the tension of the spring 15, the cap 12 is rotated so as to tend to unscrew it from the end of the bearing 8, and as it moves to the right it will carry shaft 13 along with it. The extreme right or outer end of shaft 13 has a slightly reduced portion 17, to which a member 18, driven from a suitable motor, may be coupled for the purpose of rotating the shaft. The inner or left hand end of the shaft 13 is provided with a reduced threaded portion 19 to which the cutter 20 is connected. This cutter is of the usual construction and consists, briefly, of a tubular piece of brass pipe having longitudinal cuts 21. The plate 4 is of considerable size, being about twice as wide as the diameter of the hole to be drilled, and about three times as long, and has a layer of resilient rubber 22 cemented to the outer surface thereof. Secured to the rear surface of plate 4 is a U-shaped member 23, the free end of which carries a threaded bolt 24 whose function it is to engage the strap 25 of plate 26 and thus clamp the cutting machine in place on the glass plate 1. Plate 26, like plate 4, has a piece of resilient rubber 27 cemented to its surface.

I provide a grease cup 28 for the purpose of forcing grease into the bearing 7.

When cutting glass, it is necessary that the cutter shall operate in a paste of emery and water, and I therefore provide means for filling the cavity with the abrasive paste. I have shown two pipes 29 and 30, the former of which may be connected to a supply of paste and water, or to a supply of water, and pipe 30 serves as a drain. I preferably fill the cavity 5 and the inside of cutter 20 with a thick emery powder paste before the machine is secured in place. Pipe 30 is then stoppered as with a cork, and water introduced through pipe 29 in sufficient quantity to form a paste of the proper consistency.

The operation of my machine is as follows: The cavity 5 is filled with emery paste as above described and the machine clamped in place on the glass by means of the U-shaped clamp 23, bolt 24 and plate 26. Cap 12 is then turned until it is as far to the left as it will go; this permits the spring 15 to function and to produce the necessary pressure. Water is then introduced through pipe 29 to from a paste that will freely flow.

It will be noted that the cavity 5 containing the paste and the cutter 20, is sealed so that the paste cannot run out even if it becomes very thin, as the rubber 22 is pressed firmly against the glass. A source of power, such as an electric drill operating mechanism, is connected to shaft 13 by means of a shaft having a universal joint coupling 18, and the cutter is rapidly rotated. The emery cooperates with the cutter, and very soon the latter has cut its way through the glass. The machine is then stopped, pipe 30 is opened, and the paste is permitted to drain out of the cavity 5, after which cap 12 is unscrewed and engages pin 16 to move the shaft 13 to the right, thus withdrawing the cutter from the glass. Bolt 24 is then released and the machine removed. The cut out piece of glass is then removed from the cutter and the machine is ready to be applied to a glass for the purpose of cutting another hole. The cutter 20 will, of course, wear away, and in order to compensate for this I have made the threaded portion 19 longer than necessary so that washers may be added between the shoulder on the shaft and the cutter, whenever desired.

For the specific purpose for which this machine is now constructed, the hole is slightly less than two and one-half (2½) inches, but my machine is as well adapted to cut any other sizes of holes. The object of putting the cutter near one end of the plate 4 instead of near the center is so that a hole may be cut near the windshield frame.

The terms "right" and "left" which are heretofore employed, are used with reference to Figs. 2 to 5, inclusive.

It should be noted that in Figs. 2 and 3 the cutter is held in the retracted position because it engages the glass plate 1 to be cut, the screw cap or nut 12 being moved toward the left to permit the spring 15 to function, thus leaving a space between the closed end of the nut and the stop pin 16.

In Fig. 4 the cutter is not in contact with the glass, but is nevertheless held in the retracted position; this is due to the fact that the nut or cap 12 is moved toward the right or in the reverse position from that shown in Figs. 2 and 3. Hence, in Fig. 4, the nut is in contact with the pin.

In Fig. 5 the cutter is at its limit of movement toward the left, the screw cap or nut being in the same position as in Figs. 2 and 3; but in the latter the nut is spaced from the pin, while in Fig. 5 the nut and pin are in contact.

Attention is called to the fact that two additional short pipes or nipples 31 and 32 are illustrated in Fig. 1. The nipples 31 and 32 occupy positions at right angles to those designated 29 and 30 and are, of course, stopped or closed when the device is in use in the position shown in the drawing. But the device may be applied to the end instead of the top of the windshield glass, in which event the yoke 23 would occupy a position at right angles to that shown in the drawing. The nipples 31 and 32 would then occupy vertical positions and would be used for inlet and drainage purposes instead of the nipples 29 and 30; the latter would then be stopped or closed. In the drawing these stoppers or closures for the nipples are not illustrated. They may be screw caps or any other form of stopper desired. It will be noted that in the drawings the nipples are exteriorly threaded so that screw caps may be employed.

In the operation of the device it should be remembered that before clamping the structure to the windshield or glass for beginning the cutting operation, the cutter should be retracted by adjusting the nut or screw cap 12 to cause it to occupy the position shown in Fig. 4. However, as soon as the device is clamped in position for use, as shown in Figs. 1 to 3, inclusive, the nut or screw cap must be adjusted to occupy the position shown in Figs. 2 and 3 to permit the spring 15 to function.

Having now described my invention, what I claim as new is

1. A machine of the character described, comprising, in combination, a tubular body member having an enlarged cavity at one end said cavity being closed to confine an abradant when the machine is in use, a cutter rotatably mounted in said cavity, means comprising a spring tending to move said cutter in an outward direction with respect to the cavity, means whereby said cutter may be rotated, means for clamping said machine against the surface of a piece of glass said means including a U-shaped yoke, and means for moving said cutter against the tension of the spring.

2. A machine of the character described, comprising, in combination, a tubular body member having an enlarged cavity at one end, an elongated cylindrical chamber at the other end, a bearing at each end of said chamber, a shaft having a collar rotatably mounted in said chamber and having one end extending into said cavity, a cutter secured to said shaft within said cavity, a spring within said chamber and surrounding said shaft, said spring being under compression and having its ends abutting said collar and one bearing, means for rotating said shaft and cutter, means for moving said shaft and cutter against the action of said spring, a plate secured to the outer end of said cavity, and means for clamping said machine to a glass to be cut.

3. A device of the character specified, comprising, in combination, a support having spaced bearings, means for clamping said support to a glass said means including a U-shaped yoke connected with the support, a cutter rotatably mounted in said bearings, means comprising a spring tending to move said cutter towards the glass, means for applying an abrasive paste to the cutter and the glass, and means whereby the cutter may be rotated.

4. A device of the character specified, comprising a support having a hollow head closed to confine an abradant when the device is in use, a cutter rotatably mounted therein, means for automatically moving the cutter longitudinally, means for rotating the cutter, and means cooperating with the cutter for securing the material to be cut in place, said means including a U-shaped yoke.

5. A cutter of the class described, comprising a support having a hollow head open adjacent to the material to be cut said head being closed to confine an abradant when the cutter is in use, means for clamping the support in place including a U-shaped yoke, a hollow cutter located in said head rotatably mounted in said support and under tension to feed automatically toward the glass to keep pace with the cutting act, means movable on the support in one direction and connected in operative relation to retract the cutter, said means being movable in the opposite direction to permit the feed tension on the cutter to function during the glass cutting operation.

6. A cutter of the class described, comprising a support having a hollow head adapted to receive and hold an abrasive substance when the device is in use, a hollow cutter rotatably mounted in the head, and having an operating spindle journaled in the support, a spring carried by the spindle and under tension to impart feeding stress to the cutter to keep pace with the cutting act, and means mounted on the support and connected in operative relation with the spindle to retract the cutter when moved in one direction and to release the cutter to allow the spring to function when moved in the opposite direction.

7. A cutter of the class described, comprising a support having a hollow head adapted to receive and hold an abrasive substance when the device is in use, a hollow cutter rotatably mounted in the head and having an operating spindle journaled in the support, a spring carried by the spindle and under tension to impart feeding stress to the cutter to keep pace with the cutting act, a nut mounted to travel on the support and adapted to engage a stop on the spindle to retract the cutter when moved in one direction and to release the cutter to allow the spring to function when moved in the opposite direction.

8. A device of the character specified comprising, in combination, a cutter, a body having a cavity therein for enclosing said cutter and an abradant, means for positively retracting said cutter into said body away from cutting position, means whereby the cutter may be rotated, and means for securing the device to a piece of glass to be cut.

In testimony whereof I affix my signature.

JOHN EUGENE WALKER.